United States Patent

Poon et al.

Patent Number: 5,657,212
Date of Patent: Aug. 12, 1997

[54] CAPACITOR COUPLED CONVERTER

[76] Inventors: Franki N. K. Poon, Flat 17, 12/F, Chung Yew Building, No. 75, Kok Cheung Street, Tai Kok Tsui, Kowloon; Bryan M. H. Pong, Room 1616, Block D, Kornhill, Quarry Bay, both of Hong Kong

[21] Appl. No.: 515,049

[22] Filed: Aug. 14, 1995

[51] Int. Cl.$^6$ .................................................. H02M 3/335
[52] U.S. Cl. ............................................. 363/17; 363/132
[58] Field of Search ................................ 363/16, 17, 98, 363/132

[56] References Cited

U.S. PATENT DOCUMENTS

| | | | |
|---|---|---|---|
| 5,325,283 | 6/1994 | Farrington et al. | 363/98 X |
| 5,500,792 | 3/1996 | Jeon et al. | 363/98 |
| 5,539,630 | 7/1996 | Pietkiewicz et al. | 363/17 |

*Primary Examiner*—Peter S. Wong
*Assistant Examiner*—Y. J. Han

[57] ABSTRACT

The capacitor coupled converter (CCC) is a DC-DC converter which produce a DC source as the output. It has two input terminals for connection to a DC voltage source, two output terminals for connection to a load, and a plurality of circuit control terminals for receiving a plurality of control waveforms. The basic elements of the CCC are two switches connected in series across the input terminals. An inductor in series with a transformer is connected to the junction of the two switches. Two capacitors with parallel diodes are connected across the input DC voltage source. The junction between the two capacitors is connected to one of the primary terminal of the transformer. The secondary terminals of the transformer is connected to an AC-DC converter, typically two diodes which rectify the AC to DC. The DC is then filtered by an inductor-capacitor filter. During operation, the two switches periodically and alternately open and close. The two capacitors across the input terminals are charged and discharged alternately by a current through the primary circuit. Triangular waveform is produced across the transformer which transfer power to the output. The power output is limited inherently by the charging process. The CCC also enables zero voltage switching. A switch is closed only when a near-zero voltage exists across the switch. In order to bring about this result, a diode and capacitor are connected in parallel with each switch. When one switch opens, the other switch closes usually when there is less than 0.7 volts across the switch. The time period during which the voltage across the switch to be closed is less than 0.7 volts is a function of the resonant frequency of the capacitance associated with the switch to be closed and the inductance associated with the primary circuit. Zero voltage switching reduce loss associated with the switches.

1 Claim, 5 Drawing Sheets

CAPACITOR COUPLED CONVERTER

BACKGROUND OF THE INVENTION

This invention relates generally to DC-DC power converters.

There are two popular approaches to the design of DC-DC converters, both of them convert a DC voltage source into an AC source switching power semiconductor switches on and off at a high frequency. The AC source is then rectified to DC output. These approaches provide the means for achieving small, light-weight, and highly-efficient converters.

One approach of the DC to AC process is to generate a stream of pulses and to control the output voltage by controlling the width of the pulses. This pulse-width modulation (PWM) approach results in square-wave voltage waveforms across the switches and switching losses tend to be high and the electromagnetic interference (EMI) that accompanies the process is also high and difficult to control by filtering.

A second approach to DC-AC conversion is to add capacitor-inductor resonating elements to the PWM configurations in order to obtain sinusoidal voltage and/or current waveforms and achieve zero voltage or zero current switchings. These resonant converters have lower switching losses, thereby permitting operation at higher switching frequencies. The EMI generated by resonant converters is lower, and the higher switching frequencies result in reduction in size, weight and cost. However, resonant switching means that the semiconductor switches are subjected to greater stress, and switches designed for greater stress also have larger "on" resistance which tends to increase switching losses.

Both PWM converters and resonant converters do not have control on the amount of power transfer. In the case of short circuit of the output, the amount of power transfer increases drastically which result in destruction of the semiconductor switches or overheating.

There is a need for DC-DC converters that combines the simplicity of PWM converters with the low loss characteristics of resonant converters, yet it is desirable for the converters to have power limits for reliable operation.

BRIEF SUMMARY OF THE INVENTION

The Capacitor Coupled Converter (CCC) is a DC-DC converter. This converter enables the semiconductor switches to switch at zero voltage, nevertheless, the switches are not subjected to high voltage or current pulses. Thus switching loss is minimized. The EMI produced by the CCC is lower than PWM converters as the output waveform is triangular rather than rectangular. The CCC has inherent power limit with which the converter is protected against short circuit, thus enhancing the reliability of the converter. The CCC is particularly suitable for battery charger applications.

The CCC comprises two input terminals for connection to a DC voltage source, two output terminals which provide a DC source, and a plurality of circuit control terminals for receiving a plurality of control waveforms. The embodiment of the CCC comprises first and second switches connected in series across the input terminals, each switch having first and second switch terminals and a control terminal. An inductor is connected to the junction of the first and second switch which is then connected to a transformer. Two capacitors with parallel diodes are connected in series across the input terminals. The junction between these two capacitor-diode combination is connected to the transformer.

During operation the first and second switches periodically and alternately open and close. The closure of the first switch causes a capacitor of the two connected across the input terminals to be charged up, and the other one to be discharged. The closure of the second switch causes the other capacitor to be charged up, while the one previously charged capacitor is discharged at the same time. Power is transferred through the transformer during these charging and discharging time periods. The amount of power transfer is a function of the capacitance of the capacitors and the number of charging and discharging in a second, or the switching frequency of the converter.

The control waveform appearing on the first circuit control terminal causes the first switch to periodically close for a first time period, and the control waveform appearing on the second circuit control terminal causes the second switch to periodically close for a second time period, only one of the switches being closed at any given time. The first and second time periods are typically the same in magnitude. A predetermined third time period separates the opening of the first switch and the closing of the second switch. A time period of the same magnitude separates the opening of the second switch and the closing of the first switch.

In most cases a switch is closed when a voltage less than 0.7 volts exist across the switch. The inherent capacitance of the switch and the inherent inductance of the transformer may be sufficient to bring about this result. In order to extend the time period for bringing about this result, a diode and capacitor can be connected in parallel with each switch and/or an inductor is connected in series with the transformer. When one switch opens, the other switch close when there is less than 0.7 volts across the switch. The time period during which the voltage across the switch to be closed is less than 0.7 volts is a function of the resonant frequency of the capacitance associated with the switch to be closed and the inductance associated with the transformer.

DESCRIPTION OF THE PREFERRED EMBODIMENT

Figure 1:
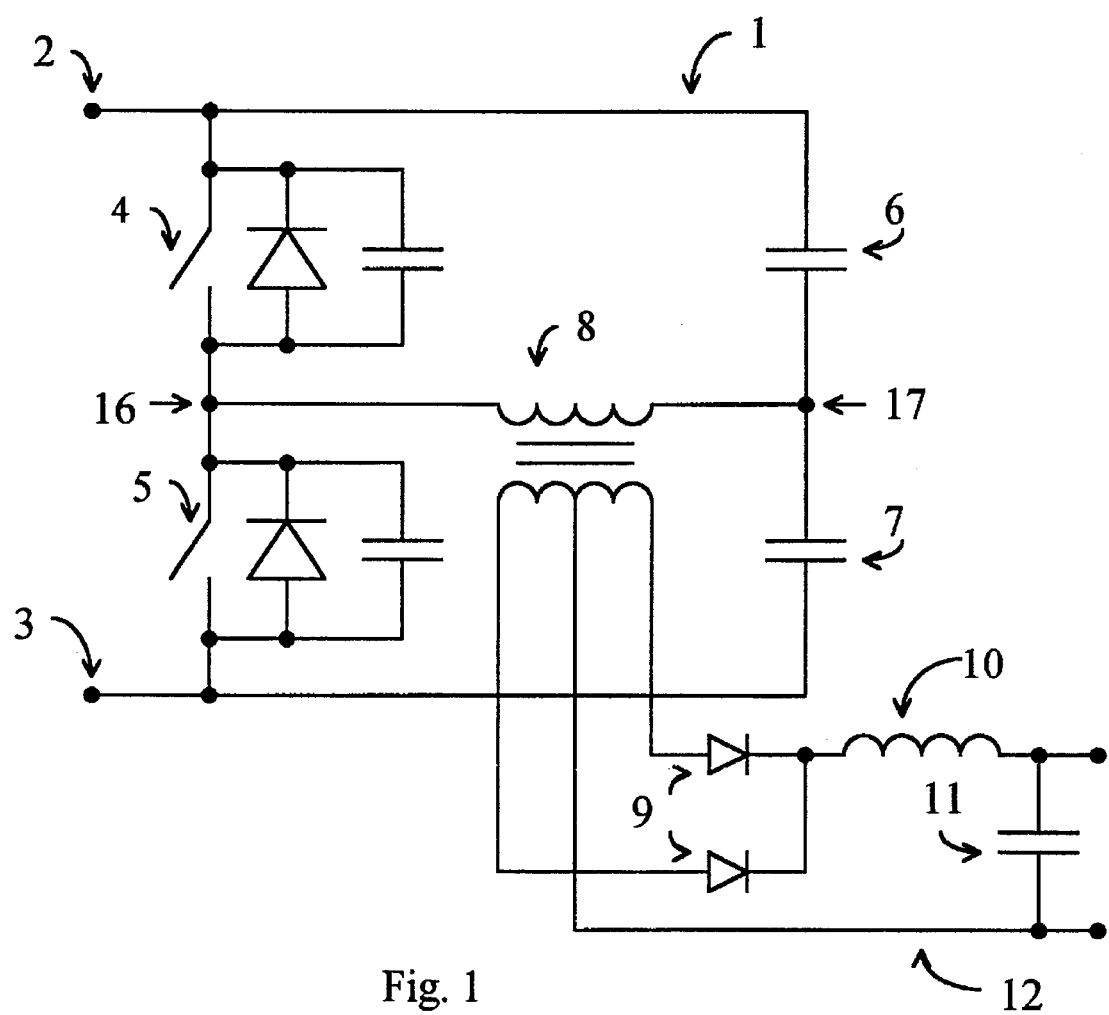
FIG. 1 is the circuit diagram of a prior-art half bridge PWM converter.

The Capacitor Coupled Converter is most conveniently described in the context of the half bridge converter 1 shown in FIG. 1. The PWM converter 1 consists of two switch-diode capacitor combinations 4 and 5 connected in series to input terminals 2 and 3 which are in turn connected to a DC voltage source. This DC voltage source may be a voltage source by itself or derived from the rectification of an AC source, typically the AC mains. In the material that follows, a "switch-diode-capacitor combination" will be referred to as an "SDC". The capacitor and/or the diode of the SDC may be components external to the semiconductor switch or inherent elements of the switch.

A voltage dividing circuit consisting of capacitors 6 and 7 also connects to the input lines attached to terminals 2 and 3. An interface circuit 8 is connected between the junction of the two SDCs and the two capacitors at 16 and 17. This interface circuit is typically a transformer although other types of interface circuits are also used. This interface is then typically connected to an AC-DC converter with diodes 9 and an inductor-capacitor filter 12 with inductor 10 and capacitor 11.

Figure 2:
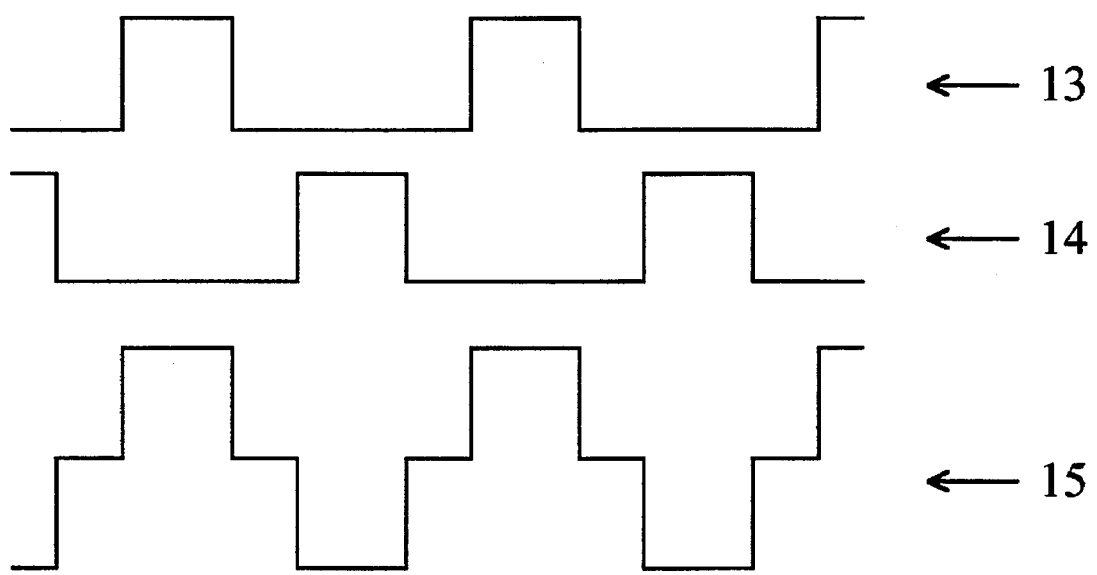
FIG. 2 shows typical control waveforms for controlling the operation of a prior-art PWM converter and the waveform on the primary side of the transformer that results from the use of these control waveforms.

The switches in SDCs 4 and 5 are controlled respectively by the control waveforms 13 and 14 as shown in FIG. 2. The switches are closed when the control waveforms are high and open when the waveforms are low. The waveform 13 is identical to waveform 14 except that it is delayed by half a period. The frequency of the control waveforms 13 and 14 is fixed, but the duty cycle, i.e. the ratio of the switch closure time to the period can be varied from 0 to 0.5. The duty cycle determines the magnitude of the voltage transferred through the interface circuit to the AC-DC converter.

Assuming the voltage at terminal 2 is positive and that at terminal 3 is negative and of the same magnitude, the voltage waveform 15 that appears across the interface points at 16 and 17 is a bipolar stream of pulses of constant amplitude that can be modulated in width by varying the duty cycle.

Figure 3:
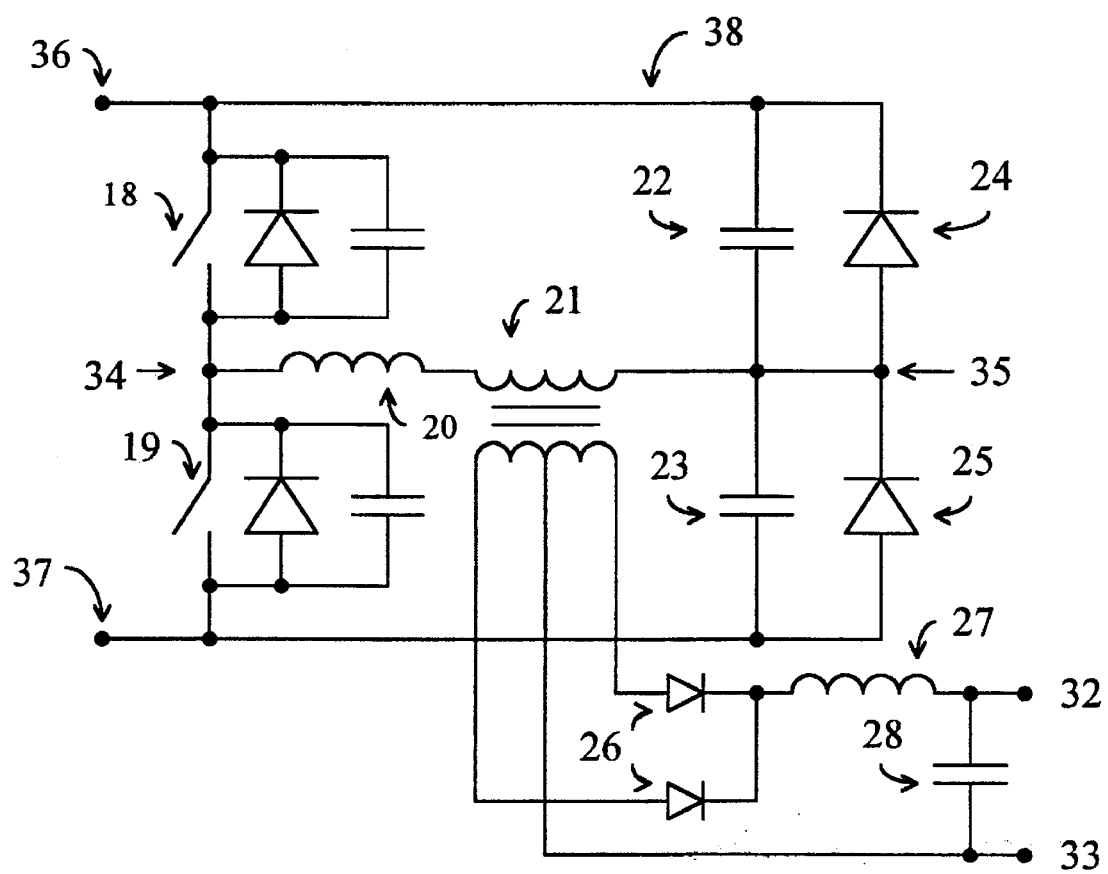
FIG. 3 is the embodiment of the capacitor coupled converter.

The Capacitor Coupled Converter (CCC) circuit is shown in FIG. 3. The CCC has two SDCs connected in series across the input terminals 36 and 37. The embodiment of the CCC looks similar to that of a half bridge but the CCC is in fact very different. It has two capacitors 22 and 23 connected across the input lines similar to that of a half bridge, however, the capacitance of these capacitors are much less than those of a half bridge circuit. They are charged and discharged within one switching time period while the capacitors of a half bridge serve as charge reservoir and act like DC source in a switching time period. Two diodes 24 and 25 are connected across these capacitors. In between the junctions of the two SDCs and the capacitor-diode combinations at 34 and 35, an inductor 20 and an interface 21 are connected in series. The interface 21 is typically a transformer although other types of interface are possible. On the secondary side of the transformer an AC-DC conversion means is connected, typically diodes 26 are used. The DC output is then filtered by the inductor-capacitor 27 and 28. Smoothed DC output is available at terminals 32 and 33.

Figure 4:
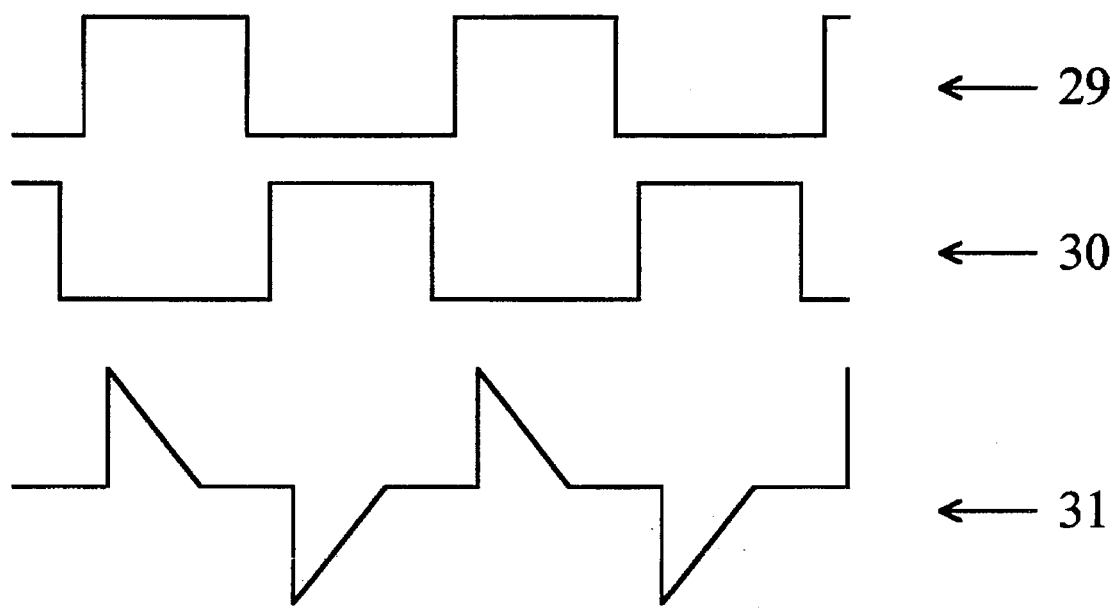
FIG. 4 shows typical control waveforms for controlling the operation of the capacitor coupled converter and the waveform on the primary side of the transformer that results from the use of these control waveforms.

A typical set of switch control waveforms 29 and 30 for controlling the switches in SDCs 18 and 19 respectively are shown in FIG. 4. The time period of waveform 29 is typically the same as that of waveform 30 execpt that the waveform 30 is delayed by half a period. A predetermined dead time period is maintained between the opening of the SDC 18 and closure of SDC 19 so that the two SDCs will not turn on at the same time. This is illustrated by the time period between the falling edge of waveform 29 and the rising edge of waveform 30. The same time period is maintained between the falling edge of waveform 30 and the rising edge of waveform 29. The CCC is a frequency modulated converter. The time period varies to change the output power while the predetermined time period between the falling and rising edges of waveforms 29 and 30 remain constant in general.

The CCC of FIG. 3 operates as follows when a DC voltage is applied across terminals 36 and 37 while terminal 36 being positive, a load is connected across terminals 32 and 33, and control waveforms 29, 30 generically described in FIG. 4 are applied to SDCs 18 and 19 respectively. At the rising edge of waveform 29, SDC 18 closes and current flow through the inductor 20, transformer 21 and eventually charges up capacitor 23. When capacitor 23 is being charged up, the capacitor voltage rises and simultaneously capacitor 22 is being discharged. The current through the inductor 27 at the output is in general constant in the time period concerned, this makes the current through inductor 20 and transformer 21 constant as well. Hence the voltage appear across the transformer has a triangular shape as shown in waveform 31 of FIG. 4. Power is transferred to the secondary side of the transformer. The voltage across capacitor 23 continuous to rise until diode 24 is turned on. In this stage current is maintained by inductor 20 and current flow in the loop involving SDC 18, inductor 20, transformer 21 and diode 24. No power is transferred to the secondary side of the transformer since the primary voltage across the transformer is essentially zero.

When the SDC 18 switch opens, inductor 20 tries to maintain the current, the SDC 18 capacitor is charged, and the SDC 19 capacitor is first discharged and then recharged with opposite polarity until the SDC 19 diode becomes forward-biased. When the SDC 19 diode becomes forward-biased, it conducts current, and limits the voltage across the SDC 19 switch to approximately 0.7 volts, assuming the diode is a silicon device.

The dead time between the opening of the SDC 18 switch and the closing of the SDC 19 switch is made long enough for the SDC 19 diode to become forward-biased but not so long that the SDC 19 diode becomes reverse-biased again (as a result of the recharging of the SDC 19 capacitor) and no longer limits the voltage across the SDC 19 switch. Thus, the SDC 19 switch is caused to close when the voltage across the switch is near zero (i.e. no greater than 0.7 volts) thereby minimizing the loss that occurs when the SDC 19 switch is closed.

The time required for an SDC diode to become forward-biased after the switch in the other SDC is opened is a function of the resonant frequency of the sum of the capacitances associated with the switches and the inductance on the primary side of the transformer. The capacitance associated with a switch is the sum of the capacitance of the switch, the capacitance of any capacitors that are bridged across the switch terminals, and any stray capacitance that arises, for example, from conductors connecting to the switch terminals. The time required for the current through the inductances on the primary side to reach zero after the SDC diode first becomes forward-biased is also a function of the resonant frequency of the sum of the capacitances associated with the switches and the inductances on the primary side.

When SDC 19 is closed, capacitor 23 is now being discharged and capacitor 22 is now being charged up. A reverse triangular voltage waveform appears across the primary side of the transformer as shown in waveform 31 of FIG. 4. Capacitors 22 and 23 are being charged and discharged respectively in a similar manner described as before but this time it operates in the reverse manner. The reverse voltage induced on the secondary side of transformer 21 is rectified to DC by the rectifier diodes 26 where filtered DC is obtained at the output terminals 32 and 33.

The process just described then repeats. Each switching time period involves charging and discharging of capacitors 22 and 23. The power transferred is proportional to $f_s \cdot C \cdot \Delta V^2$ where C is the capacitance of each of the capacitors 22 and 23, assuming that they have equal capacitances and ΔV is the change in voltage across each capacitor in the time period when power is transferred through the transformer, and fs is the switching frequency. With this capacitor coupled arrangement, the power transfer is in general controlled by the switching frequency. ΔV is a function of the load current which affects the charging slope of the triangular waveform 31 in FIG. 4. When the load current is low, the current reflected to the primary side of the transformer is also low, hence the change in capacitor voltage ΔV is also low and this limits the output power. In the case of open circuit at the load terminals 32 and 33 of FIG. 3, ΔV is almost zero and the power output automatically diminishes. When the load current is too high and deviates from the designed normal operating range, the time period available to charge the capacitors up is limited. This can be described by the time period during which one SDC is opened and current is diverted to the diode of the other SDC. After this process the current through inductor 20 has to change from positive to negative (or negative to positive depending on definition) direction until it reaches the designated current level. It is until then will the triangular waveform 31 of FIG. 4 start to emerge, otherwise the voltage across the primary side of transformer 21 remains zero and virtually no power is transferred. When the load current is too high, the time period required for the change of current to a high level is considerable and the time available to transfer power is thus cut down. In the case of short circuit where the current is excessively high, this circuit automatically cut down the power delivered and avoid damage to the converter. In the worst case the power transfer is not going to exceed a function of $fs \cdot C \cdot \Delta V^2$.

Figure 5:
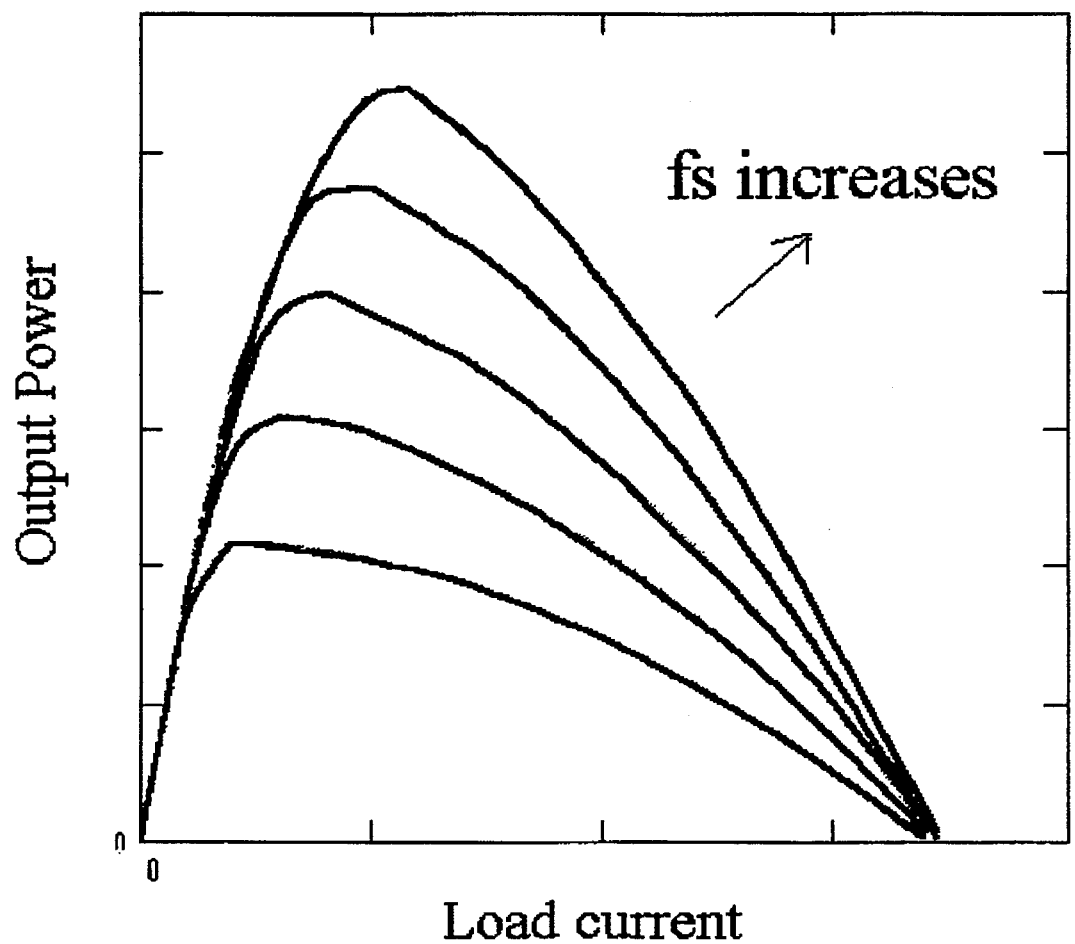
FIG. 5 shows the changes of output power with load current.

Theoretical calculation of the changes of output power with load current is shown in FIG. 5.

A prototype of the CCC embodiment 38 shown in FIG. 3 has been constructed utilizing the following components:
SDC switches: 12RF830 MOSFETs (TO-220 package without heat sinks)
SDC capacitor: 100 pF (MOSFET drain-to-source capacitance)
SDC diodes: MOSFET body diodes
inductor 20: 40 uH
transformer: EFD20 (35:10:10)
capacitor 22 and 23: 6800 pF
diode 24 and 25: FR104
diode 26: Schottky diode MBR2090CT For an input voltage of 150 V and a switching frequency of 130 kHz, the output voltage and current is 12 V & 2 A. The temperature rise of the MOSFET was only 20° C.

The switches in the CCC embodiments can be any of a number of semiconductor device types including MOSFETs, bipolar transistors (BJTs), insulated-gate bipolar transistors (IGBTs), and MOS-controlled thyristors (MCTs).

The CCC makes use of the charging and discharging of capacitors to control the amount of power transferred. This characteristic is the reason for calling the invention a Capacitor Coupled Converter (CCC). In the designated operating region the power is controlled by the load current and the switching frequency, in the case of short circuit on the load side the amount of power is limited by the reduced time to charge the capacitors; in the case of open circuit on the load side the power is cut off by the unavailability of current to charge the capacitors. Therefore inherent protection is associated with the CCC and no extra electronic components are required.

Protection of power converters have been implement in prior art converters by extra electronic circuits. These circuits sense the fault signal, for example an excessive current in the case of short circuit fault, then compare it with a pre-determined level and confirms the fault. These circuits then shut down the converter as a whole for protection purpose. These circuits must be able to respond fast, in any case before the destruction of the power devices. Such circuits not only call for extra cost but also increase the size and weight of the converter. Very often these circuits conflict normal operation by false alarm. For example many loads require rather high current for a short period of time in the start up process and such transient high current pulse is likely to trigger on the over current shut down circuit. The CCC provides such protection with no extra circuits as the feature is inherent with the circuit.

Another advantage of the CCC over prior converters is zero-voltage switching without requiring the use of switching devices capable of surviving high electrical stress. Zero-voltage switching is desirable because it greatly reduces the switching losses of the semiconductor switches. The losses of a switching device can be classified into three types: (1) the discharging of the stray capacitor in each turn-on cycle through the switching device; (2) the overlapping of the voltage across and the current through the switching device during the switching interval; and (3) conduction loss in the switch while the switch is on. The CCC reduces the first two types of loss by transferring without loss the energy in the stray capacitance associated with a first switch to the stray capacitance associated with a second switch during the time period beginning with the opening of the second switch and the closing of the first switch, thereby achieving zero-voltage switching. The third type of loss is also indirectly reduced as there are no excessive voltage pulses, semiconductor switches with lower voltage rating can be used which have less conduction loss as these devices have lower turn on resistance.

Zero-voltage switching has been achieved with resonant converters. However, resonant converters operate on principles very different from the CCC. Resonant converters employ the natural oscillatory nature of LC circuits to shape the voltage across a switch while the switch is open in order to create a zero-voltage condition when the switch is programmed to close. This approach call s for switches with high blocking voltage, a property which can only be achieved by increasing the "on-resistance" of the switches and accepting higher switch losses.

Most zero-voltage switching techniques require a multitude of auxiliary switches and components to fulfil the zero-voltage requirement. This complexity discourages the use of zero-voltage switching for low-power and/or cost sensitive applications.

The CCC achieves power limiting and inherent protection without requiring extra electronic control circuits. Also, the CCC operates with zero-voltage switching with no extra voltage or current stresses. The waveshape of the CCC is triangular rather than rectangular thereby making the EMI spectrum more controllable. The simple circuit configuration and drive technique make it readily applicable in the industry.

What is claimed is:

1. A circuit for a power converter, the circuit comprising:
  a first input terminal and a second input terminal for connection to a DC voltage source;
  a first output terminal and a second output terminal for connection to a load;
  a plurality of circuit control terminals for receiving a plurality of control waveforms which cause a DC source to be available at the output terminals;

first and second switches, each switch having first and second switch terminals and a control terminal, the first switch terminal of the first switch being connected to the first input terminal, the second switch terminal of the second switch being connected to the second input terminal, the second switch terminal of the first switch being connected to the first switch terminal of the second switch;

a first circuit control terminal connected to the control terminal of the first switch;

a second circuit control terminal connected to the control terminal of the second switch;

control means to enable the first and second switches periodically and alternately closing, the first switch close for a first time period and the second switch close for a second time period, the first time period and the second time period being equal in magnitude, a third time period in which the two switches are opened separates the end of the first time period and the beginning of the second time period, only one or none of the switches being closed at any given time, while a fourth time period separates the end of the second time period and the beginning of the first period, the third time period and the fourth time period being equal in magnitude;

a first diode and a first switch capacitor connected in parallel with the first switch, the first diode being reverse biased when the first switch is opened and the second switch is closed;

a second diode and a second switch capacitor connected in parallel with the second switch, the second diode being reverse biased when the first switch is closed and the second switch is opened.

first and second capacitors connected in series and connected to the first and second input terminals where these capacitors are charged up to the input line voltage and afterwards discharged to zero volt alternately within a switching cycle;

a third diode connected in parallel with the first capacitor, the third diode has its cathode connected to the input terminal with positive potential and its anode connected to the junction of the first and second capacitors, the third diode conducts for a period of time within one switching cycle;

a fourth diode connected in parallel with the second capacitor, this fourth diode has its anode connected to the input terminal with negative potential and its cathode connected to the junction of the first and second capacitors, this fourth diode conducts for a period of time within one switching cycle;

a first inductor having two terminals, a first terminal is connected to the second terminal of the first switch or the first terminal of the second switch, a second terminal of the inductor is connected to a first transformer;

the first transformer has a first primary terminal and a second primary terminal, the first transformer also has a first secondary terminal, a second secondary terminal and a third secondary terminal;

the first primary terminal of the first transformer is connected to the second terminal of the first inductor, the second primary terminal is connected to the junction of the first capacitor and the second capacitor;

the first, second and third secondary terminals of the transformer are connected to an AC/DC converter which typically consists of diodes;

the first secondary terminal is connected to a fifth diode and the second secondary terminal is connected to a sixth diode;

the fifth and sixth diodes are connected together at their cathodes and then connected to an output filter inductor, and the output filter inductor is connected to the first output terminal;

a filter capacitor is connected to the first and the second output terminals while the second output terminal is connected to the third secondary terminal of the transformer;

power limiting means such that output power delivered by said converter circuit is zero when a load current is zero, and rises to a maximum when the load current increases and then the power delivered diminishes with further increases in the load current.

* * * * *